(12) United States Patent
Fujioka (10) Patent No.: US 7,695,368 B2
(45) Date of Patent: Apr. 13, 2010

(54) GAME PROGRAM, GAME DEVICE, AND GAME METHOD

(75) Inventor: Kenji Fujioka, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 438 days.

(21) Appl. No.: 11/685,780

(22) Filed: Mar. 14, 2007

(65) Prior Publication Data

US 2007/0155454 A1    Jul. 5, 2007

Related U.S. Application Data

(63) Continuation of application No. PCT/JP2005/016631, filed on Sep. 9, 2005.

(30) Foreign Application Priority Data

Sep. 21, 2004    (JP)    ............... 2004-273570

(51) Int. Cl.
A63F 9/24    (2006.01)
(52) U.S. Cl. ............................. 463/37; 463/4
(58) Field of Classification Search ........................ None
See application file for complete search history.

(56) References Cited

U.S. PATENT DOCUMENTS 5,435,554 A * 7/1995 Lipson ........................... 463/3

6,270,413 B1 * 8/2001 Aikawa et al. ................ 463/31
6,394,896 B2 * 5/2002 Sugimoto ..................... 463/3
6,398,647 B1   6/2002 Hirai et al.
7,223,169 B2 * 5/2007 Imaeda et al. ................. 463/3

FOREIGN PATENT DOCUMENTS

| JP | 05-31256 A | 2/1993 |
| JP | 07-182092 A | 7/1995 |
| JP | 2002-939 A | 1/2002 |
| JP | 2005-192986 A | 7/2005 |
| JP | 2005-279165 A | 10/2005 |
| WO | WO98/43715 | 10/1998 |

OTHER PUBLICATIONS

Links 386 CD Players Manual, by Access Software, Inc., copyright 1995, 87 pages.*
JPO website machine translation of JP 05-31256, 16 pages.*

* cited by examiner

*Primary Examiner*—M. Sager
(74) *Attorney, Agent, or Firm*—Global IP Counselors, LLP (57) ABSTRACT

With a game implemented by the present game program, a touch panel type of monitor will be used, and a bat character displayed on the touch panel type of monitor will be rotated by a command means from a first position to a second position while the command means is in contact with the bat character. Then, the bat character will be rotated in reverse from the second position to the first position based upon the characteristics set in the bat character in response to the amount of rotation.

3 Claims, 6 Drawing Sheets

GAME PROGRAM, GAME DEVICE, AND GAME METHOD

CROSS-REFERENCE TO RELATED APPLICATIONS

This application is a continuation application of International Application No. PCT/JP2005/016631 filed on Sep. 9, 2005. The entire disclosures of International Application No. PCT/JP2005/016631 is hereby incorporated herein by reference.

This application also claims priority to Japanese Patent Application No. 2004-273570. The entire disclosure of Japanese Patent Application No. 2004-273570 is hereby incorporated herein by reference.

BACKGROUND OF THE INVENTION

1. Field of the Invention

The present invention relates to a game program, and in particular to a game program for causing a computer to implement a game that displays a rotatable character on a touch panel type of monitor. In addition, the present invention relates to a game device and a game method that is implemented by this game program.

2. Background Information

A variety of analog type games have been proposed in the past. One representative analog type game is a baseball board. With a baseball board, recessed portions are formed in the defensive position of each fielder (except for the pitcher) and the position of the outfield fence. The recessed portions of the defensive positions correspond to outs. Each of the plurality of recessed portions is arranged at a predetermined distance from each other along the fence position of the outfield. Each of the plurality of these recessed portions corresponds to any one of an out, a hit, a double, a triple, and a home run. A ball accommodating portion that can accommodate a plurality of metal balls is formed in the pitcher defensive position. The balls accommodated in the ball accommodating portion will be dispatched to the recessed portion of the catcher position by a player pulling out a lever arranged on the back side of the baseball board. A rotatable metal bat is arranged in the batter position. The tip of the bat is rotatably urged around the base end thereof from the catcher side to the pitcher side. If the player presses a cylindrical button on the surface of the board while the bat is engaged with a protrusion arranged on the catcher side, the protrusion will move below the board surface. When this occurs, the bat will rotate from the catcher side to the pitcher side.

With this type of baseball board, the balls accommodated in the ball accommodating portion will be dispatched from the pitcher side to the catcher side by the player on defense operating the lever. Here, the player at bat can hit a dispatched ball with the bat by pushing the cylindrical button. Then, when a ball that has been hit by the bat has been accommodated in a recessed portion, and an out, hit, double, triple, and a home run will be determined. For example, if a ball is accommodated in the recessed portion of the defensive position of a fielder it will be an out, and if a ball is accommodated in one of the plurality of recessed portions of the fence portion of the outfield, it will be an out, hit, double, triple or home run.

In accordance with the advances in video games in recent years, there have been attempts at bringing back analog games as video games. For example, if an analog game such as a baseball board is to be brought back as a video game, each fielder character will be displayed in the defensive positions of each fielder. If a ball is caught by a fielder character, it will be determined that the batter is out. In addition, a plurality of square regions that correspond to an out, a hit, a double, a triple, and a home run will be displayed at predetermined intervals along the fence at the fence positions in the outfield. If the ball character arrives at one of the plurality of these square regions, it will be determined that the hitter has obtained an out, a hit, a double, a triple, or a home run. Furthermore, a bat character will be displayed in the batter position.

Next, by assigning a function corresponding to the lever operation in a baseball board to a first button, the ball character from the pitcher character will be dispatched when the first button is pushed. Note that the selection of ball type can be performed prior to ball dispatch by means of a second button. In addition, the speed of the ball can be changed by continuously pushing the first button after ball dispatch. Then, by assigning a function that corresponds to the cylindrical button in the baseball board to a third button, the bat character will be swung when the third button is pushed.

If this is done, an analog game like the baseball board can be reproduced as a video game. In particular, when a player is playing defense, the type of ball to be thrown can be selected and the speed of the ball can be changed with the various buttons. Because of this, the player can dispatch the ball character from the pitcher character in various ways. However, if a player is playing offense, only the third button will be pushed in order to swing the bat character. Thus, if the player is playing offense, the player may not have the pleasure he or she feels when playing defense.

In view of the above, it will be apparent to those skilled in the art from this disclosure that there exists a need to prevent the loss of pleasure when rotating a character. This invention addresses this need in the art as well as other needs, which will become apparent to those skilled in the art from this disclosure.

SUMMARY OF THE INVENTION

A game program according to a first aspect of the present invention is a program for implementing the following functions on a computer capable of implementing a game in which a rotatable character is displayed on a touch panel type of monitor.

(1) A first position identification function that will identify a first position of a character when a command means is placed into contact with the character.

(2) A second position identification function that will identify a second position when the character is rotated around a predetermined point while the command means is in contact with the character.

(3) A rotational characteristics setting function that will set the characteristics of the character in response to the amount of rotation when the character is rotated from the first position to the second position.

(4) A reverse rotation function that will rotate the character in reverse from the second position to the first position based upon the characteristics set in the character by the rotational characteristics setting function.

(5) A reverse rotation state display function that will display the reverse rotation state of the character on the monitor.

With a game implemented by this program, the first position of a character will be identified with the first position identification function when the command means is placed into contact with the character. The second position identification function will identify the second position when the character is rotated around a predetermined point with the command means in contact with the character. The rotational characteristics setting function will set the characteristics of the character in response to the amount of rotation when the character is rotated from the first position to the second position. The reverse rotation function will rotate the character in reverse from the second position to the first position based upon the characteristics set in the character by the rotational characteristics setting function. The reverse rotation state display function will display the reverse rotation state of the character on the monitor.

With this game program, a touch panel type of monitor will be used, and a character will be rotated by the command means from a first position to a second position while command means is in contact with the character displayed on the touch panel type of monitor. Then, the character will be rotated in reverse from the second position to the first position based upon the characteristics set in the character in response to the amount of rotation.

For example, consider a case in which a game like a baseball board is reproduced on a touch panel type of monitor, and a player cause a bat character to be swung. In this case, with the program described above, the base end of the bat character can be rotated by the command means from the first position to the second position around a point while the command means is in contact with the tip of the bat character. A characteristic such as swing speed and the like can be set in the bat character in response to the amount of rotation at this time. Based upon this characteristic, the bat character can be rotated in reverse from the second position to the first position. Thus, by reproducing a baseball game such as a baseball board with a touch panel type of monitor, a player can easily rotate the bat character with the command means. In addition, the player can experience the pleasure of rotating the bat character with the command means while taking the amount of rotation of the bat character into consideration. Note that if an operation in which the bat character is rotated by the command means is implemented with an input button such as a directional command button, it may be more difficult to finely set the amount of rotation of the bat character than with the command means.

A game program according to a second aspect of the present invention is the game program of the first aspect, in which the character will be rotated in reverse from the second position to the first position with the reverse rotation function when the command means is separated from the monitor. Here, because the character will be rotated in reverse from the second position to the first position when the command means is separated from the monitor, in a baseball game for example, the player can rotate the bat character in reverse from the second position to the first position when the player has separated the command means at the second position from the monitor.

A game device according to a third aspect of the present invention is a game device that can implement a game in which a rotatable character is displayed on a touch panel type of monitor. This game device comprises first position identification means, second position identification means, rotational characteristics setting means, reverse rotation means, and reverse rotation state display means. The first position identification means will identify a first position of a character when a command means is placed into contact with the character. The second position identification means will identify a second position when the character is rotated around a predetermined point with the command means in contact with the character. The rotational characteristics setting means will set the characteristics of the character in response to the amount of rotation when the character is rotated from the first position to the second position. The reverse rotation means will rotate the character in reverse from the second position to the first position based upon the characteristics set in the character by the rotational characteristics setting means. The reverse rotation state display means will display the reverse rotation state of the character on the monitor.

A game method according to a fourth aspect of the present invention is a game method that can implement a game in which a rotatable character is displayed on a touch panel type of monitor. The game method comprises a first position identification step, a second position identification step, a rotational characteristics setting step, a reverse rotation step, and a reverse rotation state display step. The first position identification step will identify a first position of a character when a command means is placed into contact with the character. The second position identification step will identify the second position when the character is rotated around a predetermined point with the command means in contact with the character. The rotational characteristics setting step will set the characteristics of the character in response to the amount of rotation when the character is rotated from the first position to the second position. The reverse rotation step will rotate the character in reverse from the second position to the first position based upon the characteristics set in the character by the rotational characteristics setting step. The reverse rotation state display step will display the reverse rotation state of the character on the monitor.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Construction of the Game Device

Figure 1:
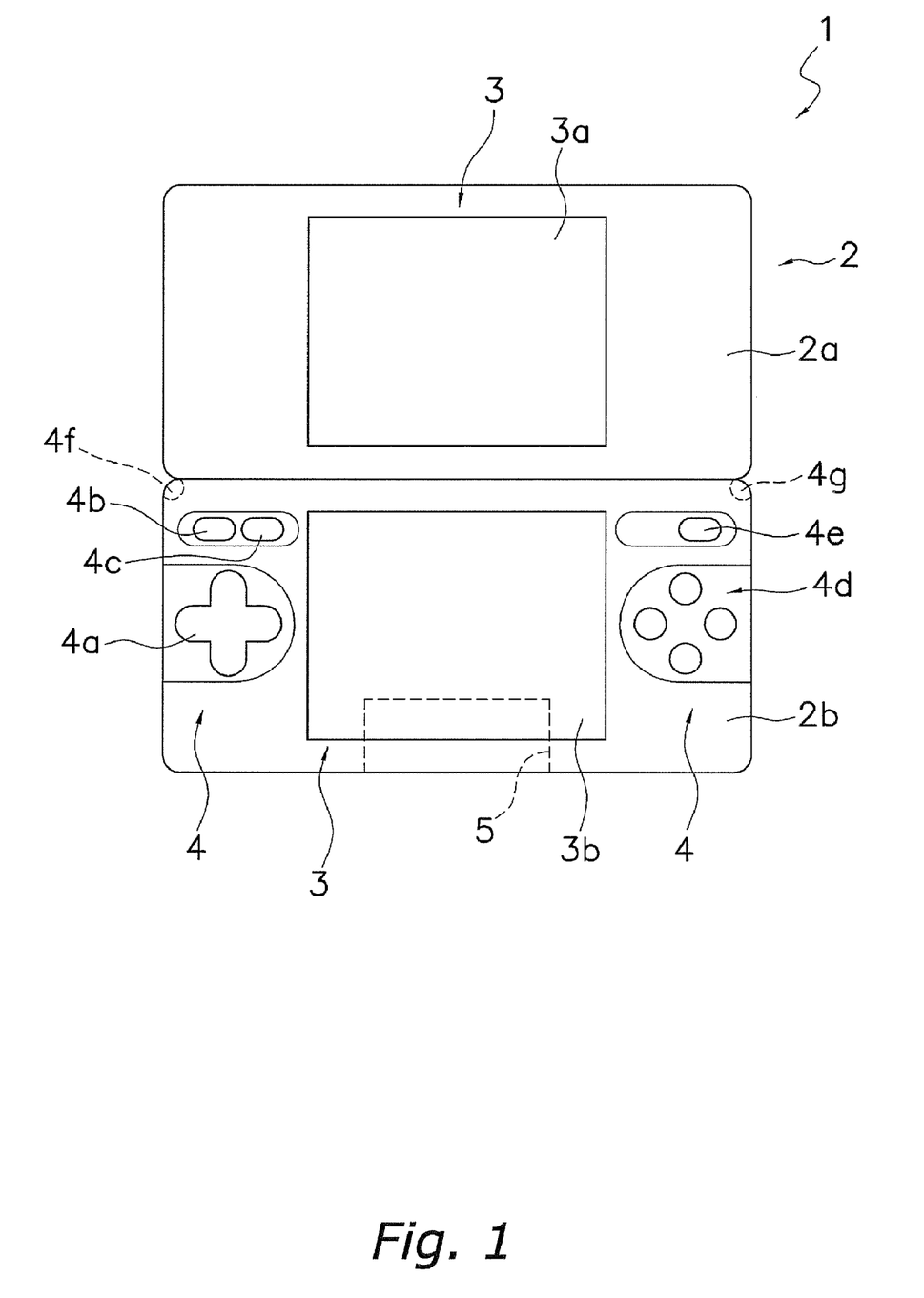
FIG. 1 is an external view of a portable game unit (an example of a computer) that can use a game program according to the present invention.

FIG. 1 is an external view of a portable game unit (an example of a computer) that can use a game program according to the present invention. In addition, FIG. 2 is one example of a control block diagram of the portable game unit.

As shown in FIG. 1, the portable game unit 1 primarily has a main case 2, a liquid crystal monitor unit 3, an input unit 4, a cartridge mounting unit 5, and a communication unit (not shown in the drawings). The main case 2 has an upper case 2a and a lower case 2b. The upper case 2a and the lower case 2b are connected to each other such that they can be opened and closed. The liquid crystal monitor unit 3 comprises an upper liquid crystal monitor 3a provided in the upper case 2a, and a lower liquid crystal monitor 3b provided in the lower case 2b. Here, for example, the upper liquid crystal monitor 3a is a non-touch panel type monitor, and the lower liquid crystal monitor 3b is a touch panel type monitor. The non-touch panel type monitor is comprised of a liquid crystal panel, and the touch panel type monitor is comprised of a liquid crystal panel and a touch panel. On the touch panel type monitor, the display surface of the liquid crystal panel and the data input surface of the touch panel are laminated together so as to be integral with each other. The input unit 4 comprises a cross-shaped directional command button 4a that is arranged on the central portion of the left side of the lower case 2b, a select button 4b and a start button 4c arranged from left to right on the upper portion of the left side of the lower case 2b, command buttons 4d that are arranged in the central portion of the right side of the lower case 2b, a power button 4e that is arranged on the upper portion of the right side of the lower case 2b, and an L button 4f and a R button 4g arranged on the left and right corners of the lower case 2b. The cartridge mounting unit 5 is provided in the lower portion of the lower case 2b. A game cartridge or the like can be mounted in the cartridge mounting unit 5. The communication unit is built into the main case 2, e.g., the lower case 2a. A local wireless network function, internet connection via wireless LAN function, or the like are provided by the communication unit. Note that a sound volume adjustment button, an earphone jack, and the like are provided in the game unit 1, but an explanation of these will be omitted.

Figure 2:
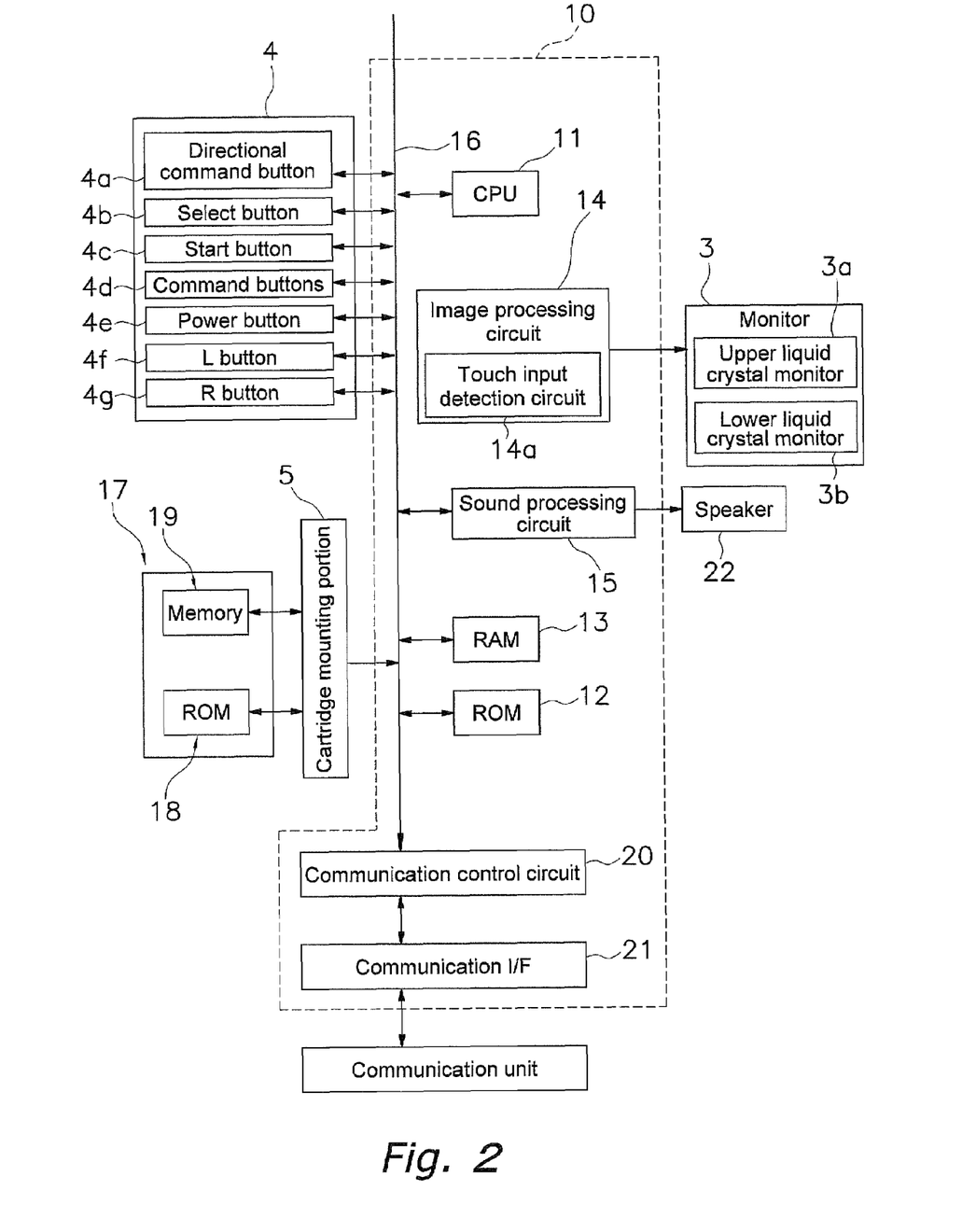
FIG. 2 is an example of a control block diagram of the portable game unit.

As shown in FIG. 2, the portable game unit 1 has a control device 10 in the interior thereof. A CPU (Central Processing Unit) 11 which uses a microprocessor, a ROM (Read Only Memory) 12 as a main storage device, a RAM (Random Access Memory) 13, an image processing circuit 14, a sound processing circuit 15, and a communication control circuit 20 of the control device 10 are connected to each other via a bus 16.

The CPU 11 will interpret instructions from a game program, and will perform various types of data processing and control. The ROM 12 will store programs and the like needed for basic control of the game unit 1 (e.g., start-up control). The RAM 13 will maintain a working area for the CPU 11. The image processing circuit 14 controls the liquid crystal monitor unit 3 in response to rendering commands from the CPU 11, and displays predetermined images on at least one of the upper liquid crystal monitor 3a and the lower liquid crystal monitor 3b. In addition, a touch input detection circuit 14a is included in the image processing circuit 14. When a command means, e.g., a touch pen, a finger, or the like is brought into direct contact with the touch panel, coordinate date of the contact position will be supplied from the touch input detection circuit 14a to the CPU 11, and the contact position will be identified by the CPU 11. In addition, when the command means is brought into direct contact with the touch panel at the position of a target object displayed on the liquid crystal panel, coordinate data of the target object will be supplied from the touch input detection circuit 14a to the CPU 11, and the target object will be identified by the CPU. The sound processing circuit 15 will produce analog audio signals in response to sound generation commands from the CPU 11, and will output the same to a speaker 22. The communication control circuit 20 is included in the communication unit, and is employed in order to wirelessly connect the game unit 1 to another game unit or the like. The communication control circuit 20 is connected to the CPU 11 via the bus 16. In response to instructions from the CPU 11, the communication control circuit 20 will control and dispatch connection signals for connecting the game unit 1 to the internet via a local wireless network or a wireless LAN.

An external storage device 17 that is separate from the control device 11 is connected to the bus 16. For example, the external storage device 17 is a game cartridge that is removably mounted in the main case 2, e.g., the lower case 2b. A ROM 18 as a storage medium, and a memory 19 as a rewriteable user memory, are provided in the interior of the external storage device 17. A game program that causes the game unit 1 to function as a computer, and various types of data needed in the execution of the game program, are stored in advance in the ROM 18. The various types of data include various types of character image data, e.g., various types of panel image data, attribute image data, and the like. Rewriteable memory such as flash memory is used in the memory 19. Saved game data or the like will be stored in the memory 19 in response to need. Note that the storage medium of the external storage device 17 is not limited to a semiconductor memory element, and various other types of storage media may be used, such as a magnetic storage medium, an optical storage medium, a magneto-optical storage medium, or the like. Note also that an interface circuit is interposed between the bus 16 and each element, but illustration of these will be omitted here.

With the game unit 1 constructed as described above, a player can play various game genres on the liquid crystal monitor unit 3 by loading a game program stored in the ROM 18 of the external storage device 17, and executing the loaded game program with the CPU 11. In addition, by connecting the game unit 1 with another game unit with a wireless network, or connecting the game unit 1 with another game unit via a communication cable or the like, data can be exchanged with another game unit or a competition type game can be played via the communication control circuit 10.

Summary of Various Types of Processes in the Game Device

Figure 3:
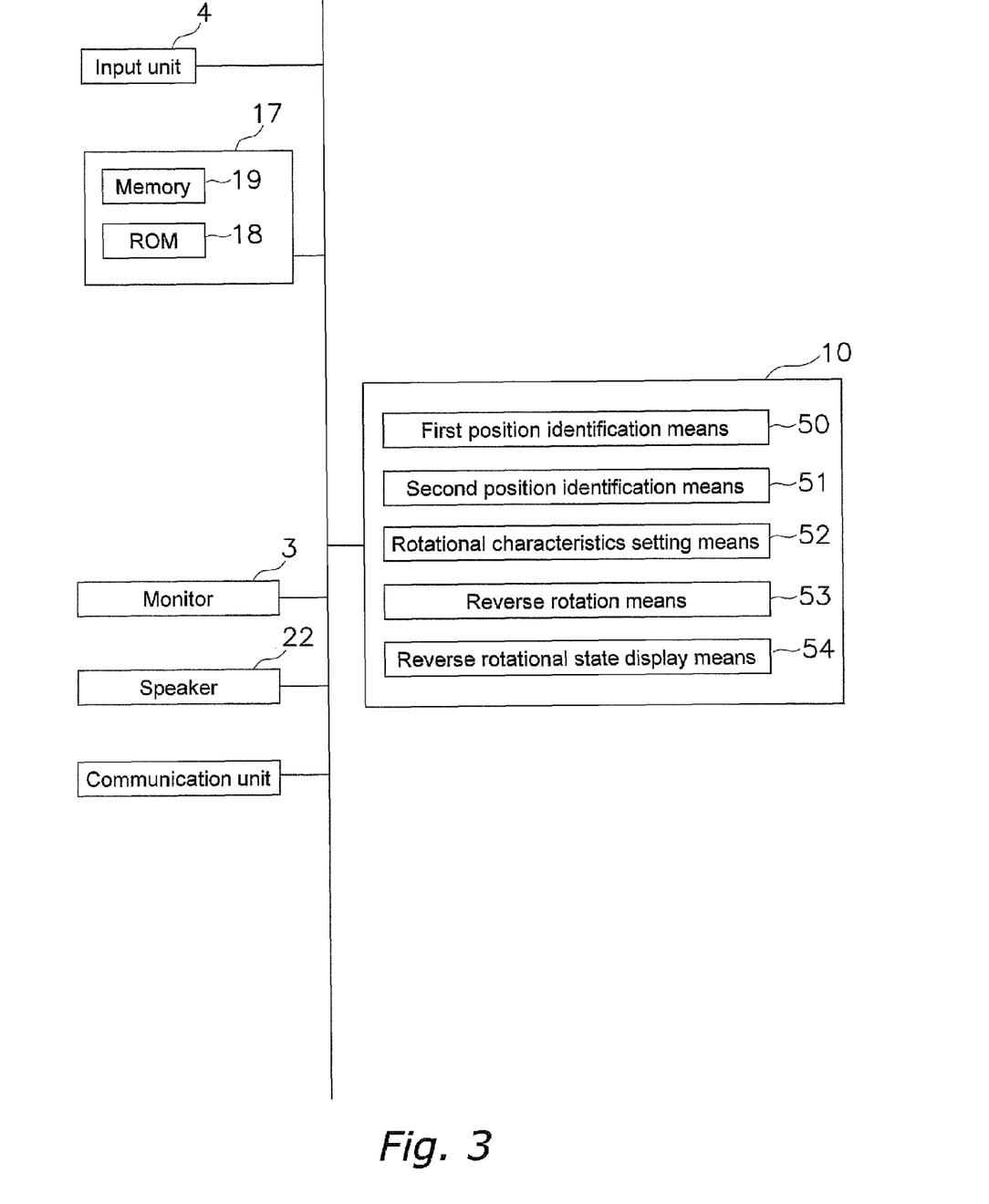
FIG. 3 is an example of a function block diagram of the portable game unit.

One game that can be executed in the present game unit 1 is a baseball game. FIG. 3 is a function block diagram for explaining the processes in the present baseball game that will be primarily executed with the control device 10 shown in FIG. 2. This block diagram will be used to explain the functions of the game unit 1 that play an essential role in the present invention.

With the present game unit 1, a rotatable character will be displayed on a touch panel type of monitor, e.g., the lower monitor 3b. The game device 1 primarily comprises first position identification means 50, second position identification means 51, rotational characteristics setting means 52, reverse rotation means 53, and reverse rotation state display means 54.

The first position identification means 50 is implemented by a function that will identify a first position of a character when the command means is placed into contact with the character. With the first position identification means 50, when the command means, e.g., a touch pen, a finger, or the like, is brought into contact with the touch panel in the position of the character displayed on the liquid crystal panel, the coordinate data of the contact position of the command means will be supplied from the touch input detection circuit 14a to the CPU 11, and will be identified by the CPU 11. If it is determined by the CPU 11 that the coordinate data of the contact position is included in the coordinate data of the character display area on the liquid crystal panel used as the touch panel, the position of the character at that time will be identified by the CPU 11 as the first position.

The second position identification means 51 is implemented by a function that will identify a second position when the character is rotated around a predetermined point with the command means in contact with the character. With the second position identification means 51, if the command means, e.g., a touch pen, a finger, or the like, is moved on the touch panel while the command means is in contact with the touch panel in the character display area of the liquid crystal panel used for the touch panel, the CPU 11 that identified a change in the coordinate data of the contact position of the command means will rotate the character on the liquid crystal panel used for the touch panel based upon coordinate data that indicates a predetermined pivot position identified in advance by the CPU 11. Then, the position of the character after rotation will be identified by the CPU 11 as the second position.

The rotational characteristics setting means 52 is implemented by a function that will set the characteristics of the character in response to the amount of rotation when the character is rotated from the first position to the second position. With the rotational characteristics setting means 52, the amount of rotation will be calculated by the CPU 11 when the character identified by the CPU 11 was rotated from the first position to the second position. Then, the characteristics, e.g., the swing speed, etc., stored in the RAM 13 from the ROM 18 will be referenced by the CPU 11, and the characteristics of the character corresponding to the calculated amount of rotation will be set to the character by the CPU 11.

The reverse rotation means 53 is implemented by a function that will rotate the character in reverse from the second position to the first position, based upon the characteristics set in the character by the rotational characteristics setting means 52. With the reverse rotation means 53, command signals for causing the character to rotate in reverse from the second position to the first position, based upon the characteristics set in the character by the rotational characteristics setting means 52, will be issued from the CPU 11 to the image processing circuit 14.

The reverse rotation state display means 54 is implemented by a function that will display the rotational state of the character on the monitor. With the reverse rotation state display means 54, the reverse rotation state of the character will be displayed on the monitor 3, e.g., the lower monitor 3b, by means of the image processing circuit 14 that received the command signals for rotating the character in reverse from the second position to the first position. More particularly, the reverse rotation state of the character will be displayed on the liquid crystal panel of the touch panel on the lower monitor 3b.

Summary of the Baseball Game

Next, the specific content of the baseball game of the present embodiment will be explained.

Figure 4:
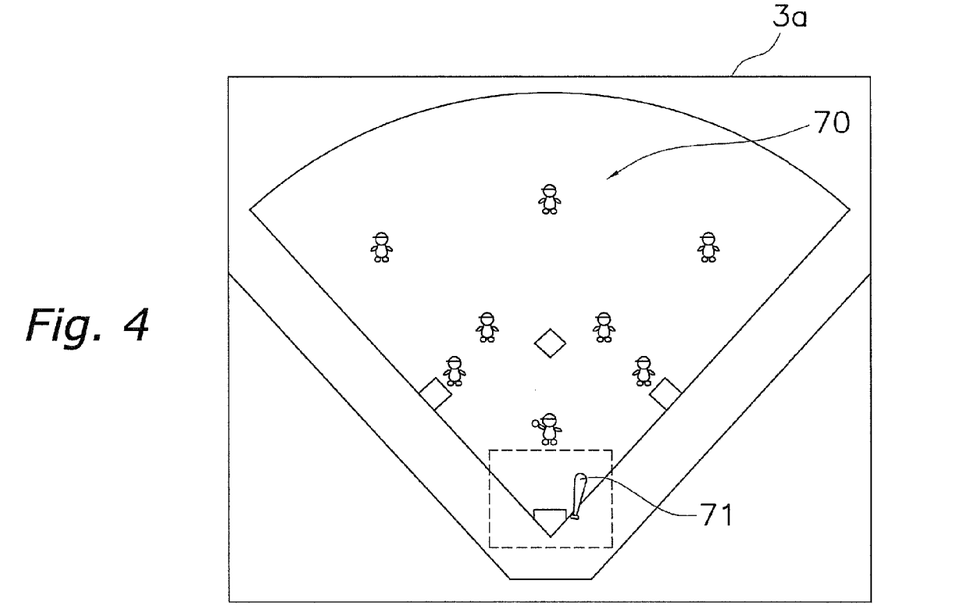
FIG. 4 is an explanation of each type of character displayed on a monitor in a baseball game (prior to bat operation).
Figure 5:
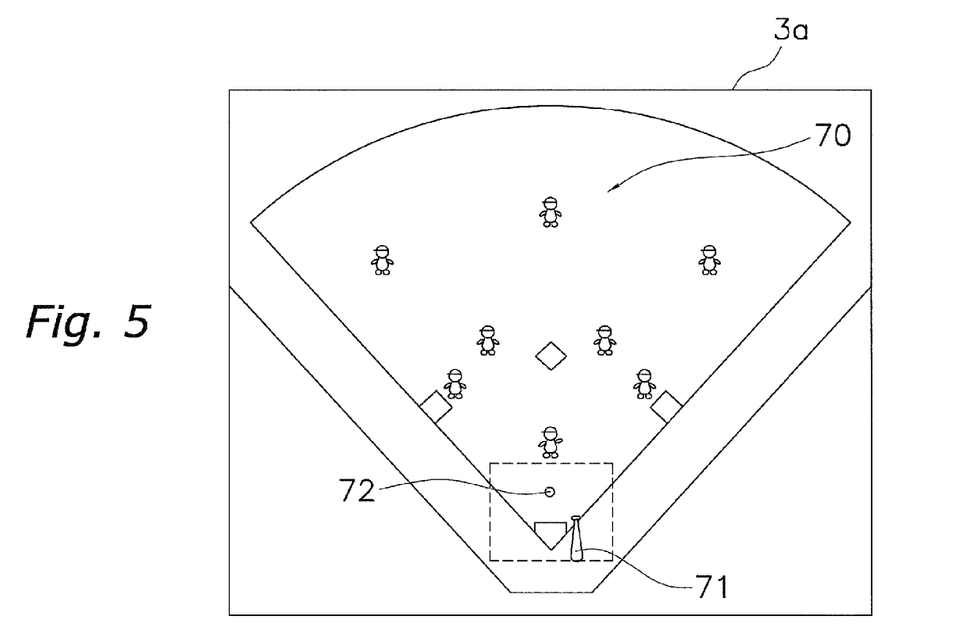
FIG. 5 is an explanation of each type of character displayed on a monitor in a baseball game (after bat operation).
Figure 6:
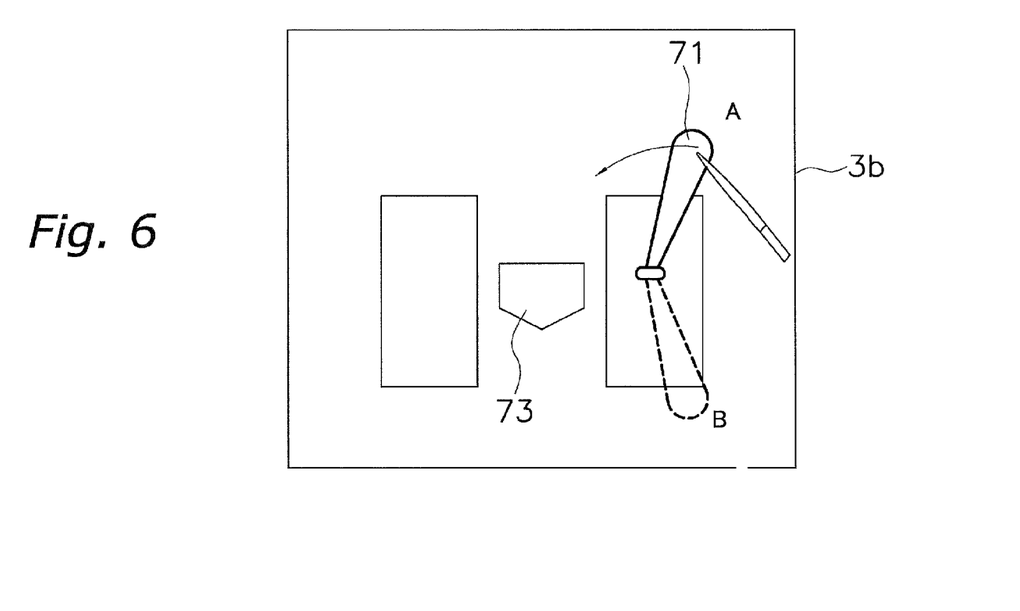
FIG. 6 is an explanation of the bat drag operation method (prior to bat operation).
Figure 7:
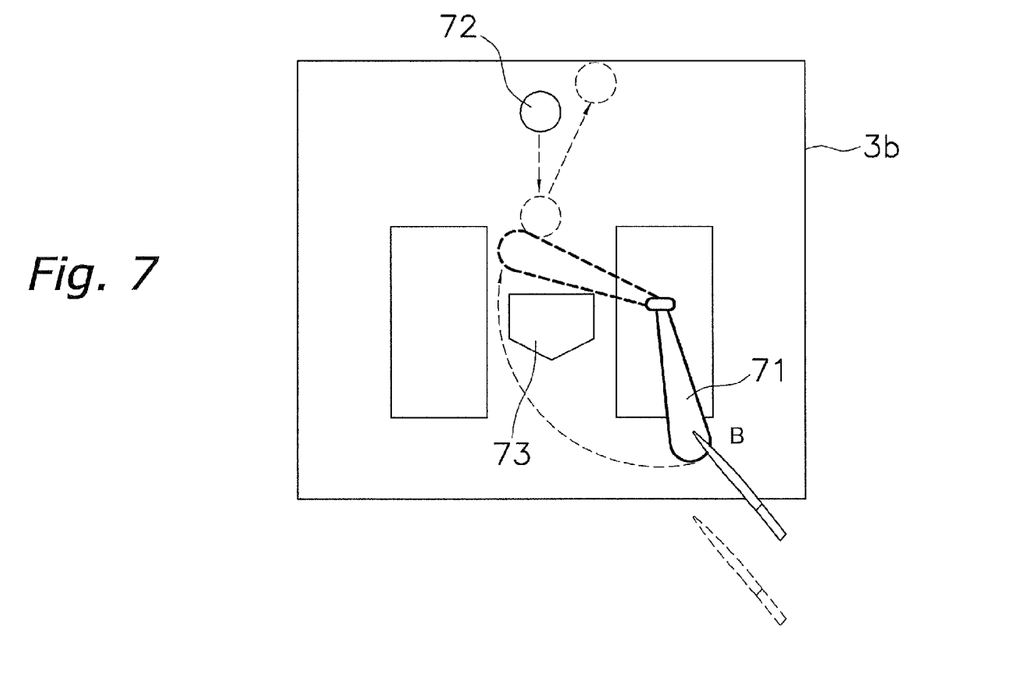
FIG. 7 is an explanation of the bat drag operation method (after bat operation).

With the present baseball game, as shown in FIGS. 4 and 5, when a player is to operate the batter, fielder characters 70, a bat character 71, and a ball character 72 will be primarily displayed on the upper non-touch panel type of monitor. Then, as shown in FIGS. 6 and 7, a home base character 73, the bat character 71, and the ball character 72 will be displayed in enlarged format on the lower touch panel type of monitor. The grip portion (the first portion) of the bat character 71 can be rotated around a pivot point by means of the touch pen.

First, as shown in FIG. 6, the player will place the touch pen in contact with the bat character 71. More specifically, the player will place the touch pen in contact with the portion (the second portion) of the bat character 71 that is away from the grip portion. Then, with the second portion of the bat character 71 in contact with the second portion, the player will move the touch pen in the counterclockwise direction, and will stop the rotational movement of the touch pen. When this occurs, the bat character 71 will be rotated from a first position A to a second position B, and the rotational state will be displayed on both the upper monitor and the lower monitor. At this point, the characteristics of the bat character 71, e.g., the swing speed and the like, will be set in response to the amount of rotation, e.g., the rotational angle, of the bat character 71. Here, the larger the rotational angle is when the bat character 71 is rotated in the counterclockwise direction, the faster the swing speed will be.

Next, as shown in FIG. 5, when the ball character 72 is dispatched from the pitcher character to the catcher character, the dispatched ball character 72 will be displayed on the upper monitor. As shown in FIG. 7, when the ball character 72 approaches the home base character 73, the ball character 72 will be displayed on the lower monitor. When the ball character 72 has drawn close to the home base character 73, the bat character 71 will rotate in the clockwise direction at the set swing speed if the player separates the touch pen from the bat character 71, and the bat character 71 will be displayed on the lower monitor rotating in the clockwise direction.

Finally, if the bat character 71 can be hit by the ball character 72, the ball character 72 will move forward from the position at which it was struck by the bat character 71. At this point, the lower monitor will display the ball character 72 as it is moving toward the home plate character 73. In addition, the upper monitor will display the ball character 72 moving toward the home base 73, and its distance from the home base character 73. For example, if the ball character 72 is directly caught by a fielder character 70 it will be an out, and if the ball character 72 flies between fielder characters 70 it will be a hit. In contrast, if the bat character 71 cannot hit the ball character 72, the ball character 72 will pass over the home base character 73 and in the direction of the catcher character. At this point, the ball character 72 passing over the home base character 73 and in the direction of the catcher character will be displayed on both the upper monitor and the lower monitor. This state corresponds to, for example, a swing and a miss. Note that if the player does not separate the touch pen from the bat character 71, the bat character 71 will not rotate in the clockwise direction. At this point, the ball character 72 passing over the home base character 73 and in the direction of the catcher character will be displayed on both the upper monitor and the lower monitor. This state corresponds to, for example, a batter not swinging at the ball.

Flow of each process during bat operation

Figure 8:
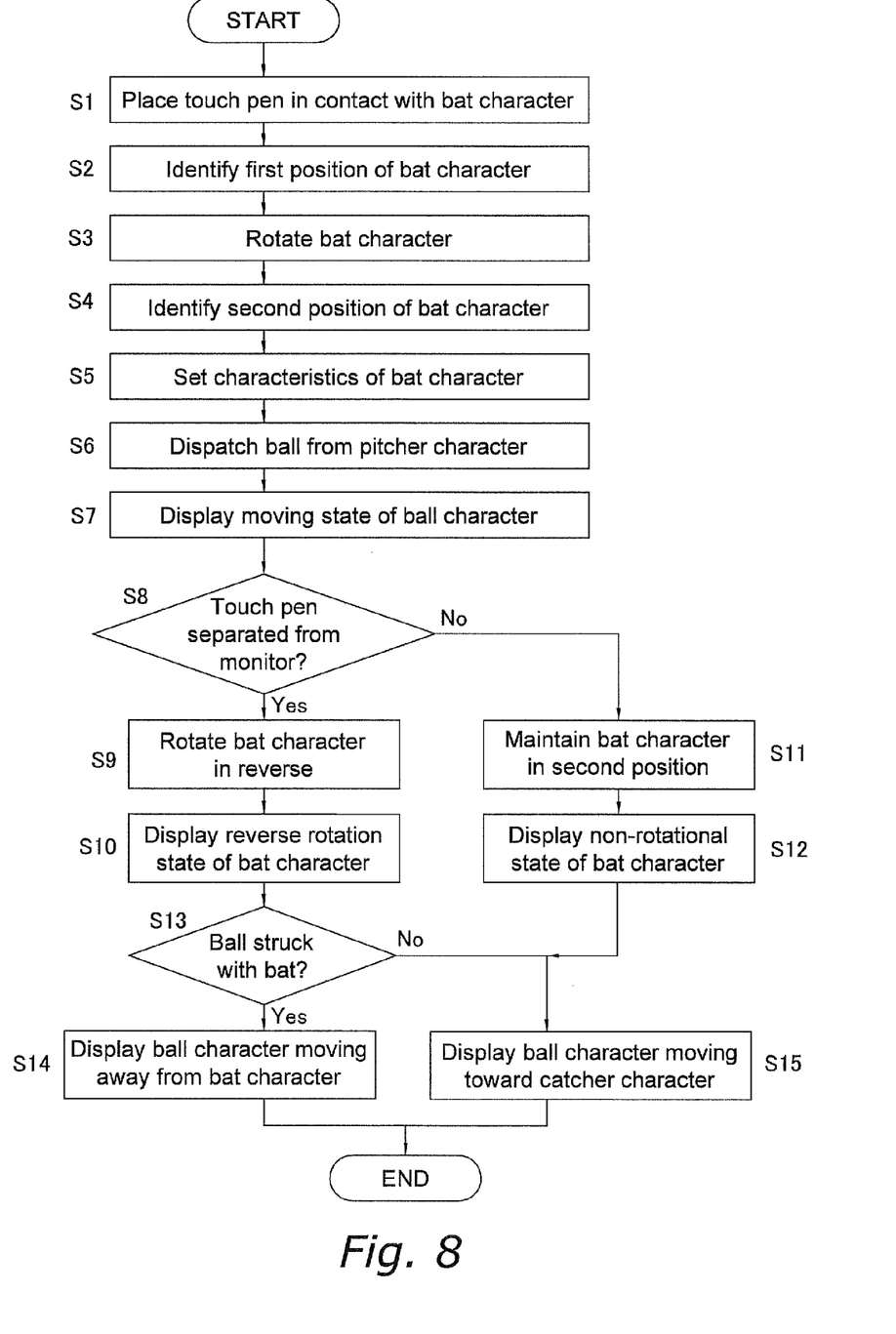
FIG. 8 is a flow chart that explains the bat operation method in a baseball game.

The flowchart shown in FIG. 8 will be used to explain the batting system in the baseball game of the present embodiment.

First, if the touch pen is placed into contact with the bat character (S1), the initial position of the bat character 71 will be identified as the first position (S2). Then, if the bat character 71 is rotated in the counterclockwise direction by the touch pen while the touch pen is in contact with the bat character 71 (S3), the position after rotation of the bat character 71 will be identified as the second position (S4). When the bat character 71 is rotated from the first position to the second position in this way, various characteristics, e.g., the swing speed and the like, will be set in the bat character 71 in response to the amount of rotation, e.g., the rotational angle, with which the bat character 71 was rotated (S5).

Next, if the ball character 72 is dispatched from the pitcher character (S6), the ball character 72 dispatched from the pitcher character will be displayed on the monitor as it is moving toward the home base character 73 (S7). Then, it will be determined whether or not the touch pen has been separated from the monitor (S8). If it is determined that the touch pen has been separated from the monitor (S8 is yes), the bat character 71 will be rotated in the counterclockwise direction (S9), and the rotational state of the bat character 71 will be displayed on the monitor (S10). If it is determined that the touch pen has not been separated from the monitor (S8 is no), the bat character 71 will be remain in the second position (S11), and the non-rotational state of the bat character 71 will be displayed on the monitor (S12). At this point, the ball character 72 passing over the home base character 73 and in the direction of the catcher character will be displayed on the monitor (S15).

Finally, it will be determined whether or not the ball character 72 has been hit by the bat character 71 (S13). If it is determined that the ball character 72 was hit by the bat character 71 (S13 is yes), then the ball character 72 moving forward from the position at which the ball character 72 was hit by the bat character 71 will be displayed on the monitor (S14). If it is determined that the ball character 72 was not hit by the bat character 71 (S13 is no), then the ball character 72 passing over the home base character 73 and toward the catcher character will be displayed on the monitor (S15).

Other Embodiments (a) With the aforementioned embodiment, an example was illustrated in which the portable game unit 1 was used as an example of a computer that can utilize the game program, however the game device is not limited to the aforementioned embodiment, and can also utilize in the same way a game device formed separately from a monitor, a game device for commercial use that is formed integrally with a monitor, and a personal computer, a workstation, or the like that functions as a game device by executing a game program.

(b) The present invention also includes a program and method for executing the game described above, and a computer readable storage medium on which the program is stored. Other than the cartridge, examples of recording media include computer readable flexible disks, semiconductor memory, CD-ROM, DVD, MO, ROM cassettes, and the like.

(c) With the aforementioned embodiment, an example was illustrated in which the bat character will rotate in reverse in the counterclockwise direction when the command means, e.g., the touch pen, was separated from the monitor. However, the aforementioned embodiment is not limited to a command method that controls the timing at which the bat character is rotated in reverse, and the bat character may be rotated in reverse in the counterclockwise direction when a predetermined button is pushed.

INDUSTRIAL APPLICABILITY

With the present invention, a touch panel type of monitor will be used, and a character will be rotated by the command means from a first position to a second position while command means is in contact with the character displayed on the touch panel type of monitor. Then, the character will be rotated in reverse from the second position to the first position based upon the characteristics set in the character in response to the amount of rotation. In this way, a player can easily rotate a character with a command means. In addition, a player can experience the pleasure of rotating a character with the command means while taking the amount of rotation of the character into consideration.

What is claimed is:

1. A computer readable medium storing a game program for causing a computer to implement a game in which a rotatable bat character is displayed on a touch panel type of monitor, comprising:

code for allowing control unit to recognize a first coordinate of input means which is placed into contact with the monitor, and allowing the control unit to recognize a position of the bat character as a frist position in case that the control unit identifies the first coordinate with at least any one of coordinates in the bat character;

code for allowing the control unit to recognize a second coordinate of the input means after movement when the input means has moved in contact with the monitor, displaying the bat character, which is rotated from the first coordinate to the second coordinate around a coordinate of a predetermined point, on the monitor, and allowing the control unit to recognize a position of the bat character after rotation as a second position;

code for allowing the control unit to calculate rotation between the first position and the second position when the bat character has rotated from the first coordinate to the second coordinate and allowing the control unit to set the rotational speed of the bat character in response to the amount of the rotation;

code for allowing the control unit to issue command to rotate the bat character in reverse from the second position to the first position based upon the rotational speed set in the bat character when the recognition of the second coordinate has stopped; and code for displaying the reverse rotation state of the character on the monitor when the command is issued by the control unit.

2. A game device capable of implementing a game in which a rotatable bat character is displayed on a touch panel type of monitor, comprising:

first position identification means for allowing control unit to recognize a first coordinate of input means which is placed into contact with the monitor, and allowing the control unit to recognize a position of the bat character as a frist position in case that the control unit identifies the first coordinate with at least any one of coordinates in the bat character;

second position identification means for allowing the control unit to recognize a second coordinate of the input means after movement when the input means has moved in contact with the monitor, displaying the bat character, which is rotated from the first coordinate to the second coordinate around a coordinate of a predetermined point, on the monitor, and allowing the control unit to recognize a position of the bat character after rotation as a second position;

rotational characteristics setting means for allowing the control unit to calculate rotation between the first position and the second position when the bat character has rotated from the first coordinate to the second coordinate and allowing the control unit to set the rotational speed of the bat character in response to the amount of the rotation;

reverse rotation means for allowing the control unit to issue command to rotate the bat character in reverse from the second position to the first position based upon the rotational speed set in the bat character when the recognition of the second coordinate has stopped; and reverse rotation state display means for displaying the reverse rotation state of the character on the monitor when the command is issued by the control unit.

3. A game method for implementing a game in which a rotatable bat character is displayed on a touch panel type of monitor, comprising:

allowing control unit to recognize a first coordinate of input means which is placed into contact with the monitor, and allowing the control unit to recognize a position of the bat character as a frist position in case that the control unit identifies the first coordinate with at least any one of coordinates in the bat character;

allowing the control unit to recognize a second coordinate of the input means after movement when the input means has moved in contact with the monitor, displaying the bat character, which is rotated from the first coordinate to the second coordinate around a coordinate of a predetermined point, on the monitor, and allowing the control unit to recognize a position of the bat character after rotation as a second position;

allowing the control unit to calculate rotation between the first position and the second position when the bat character has rotated from the first coordinate to the second coordinate and allowing the control unit to set the rotational speed of the bat character in response to the amount of the rotation;

allowing the control unit to issue command to rotate the bat character in reverse from the second position to the first position based upon the rotational speed set in the bat character when the recognition of the second coordinate has stopped; and displaying the reverse rotation state of the character on the monitor when the command is issued by the control unit.

* * * * *